Patented June 20, 1939

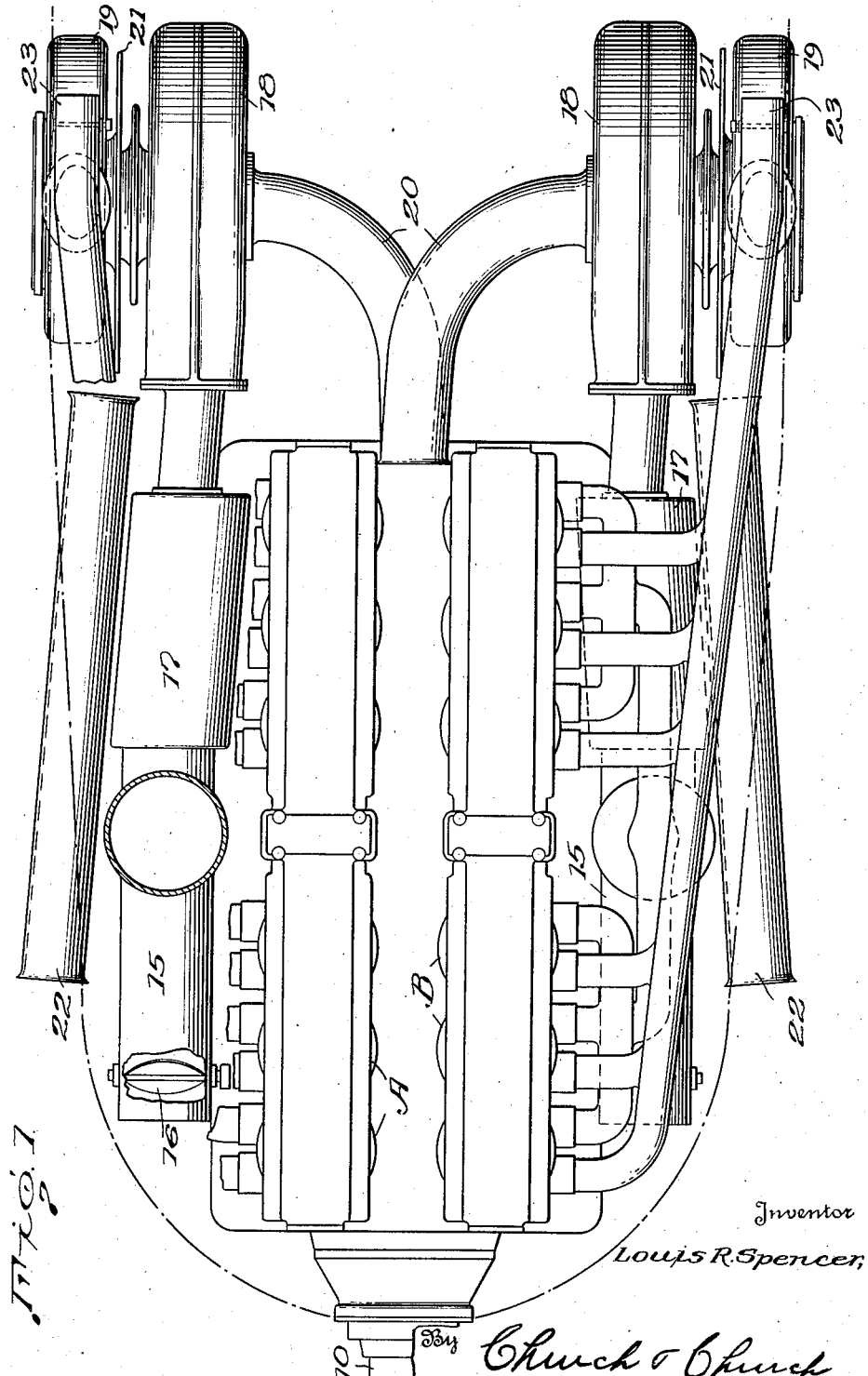

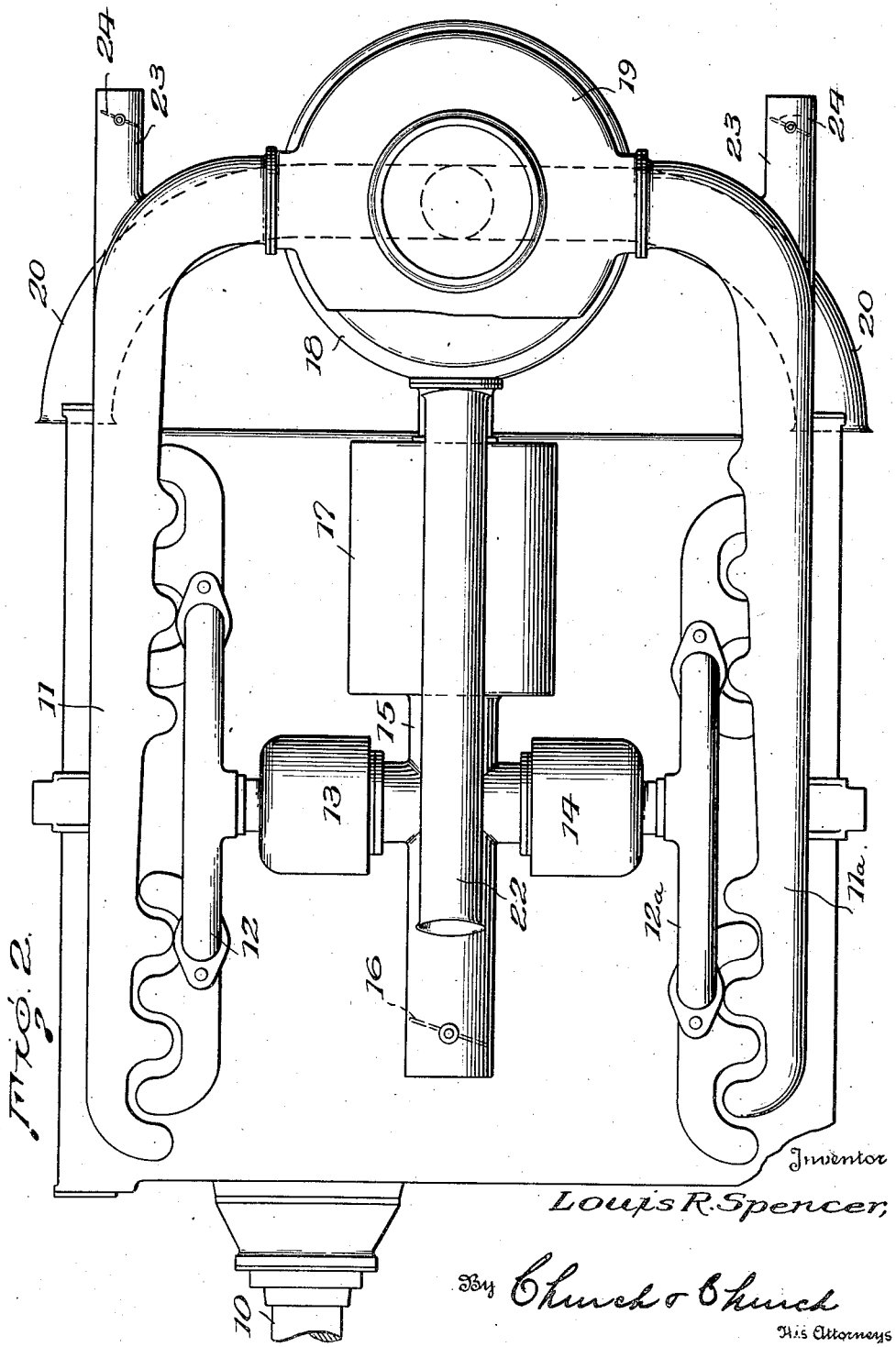

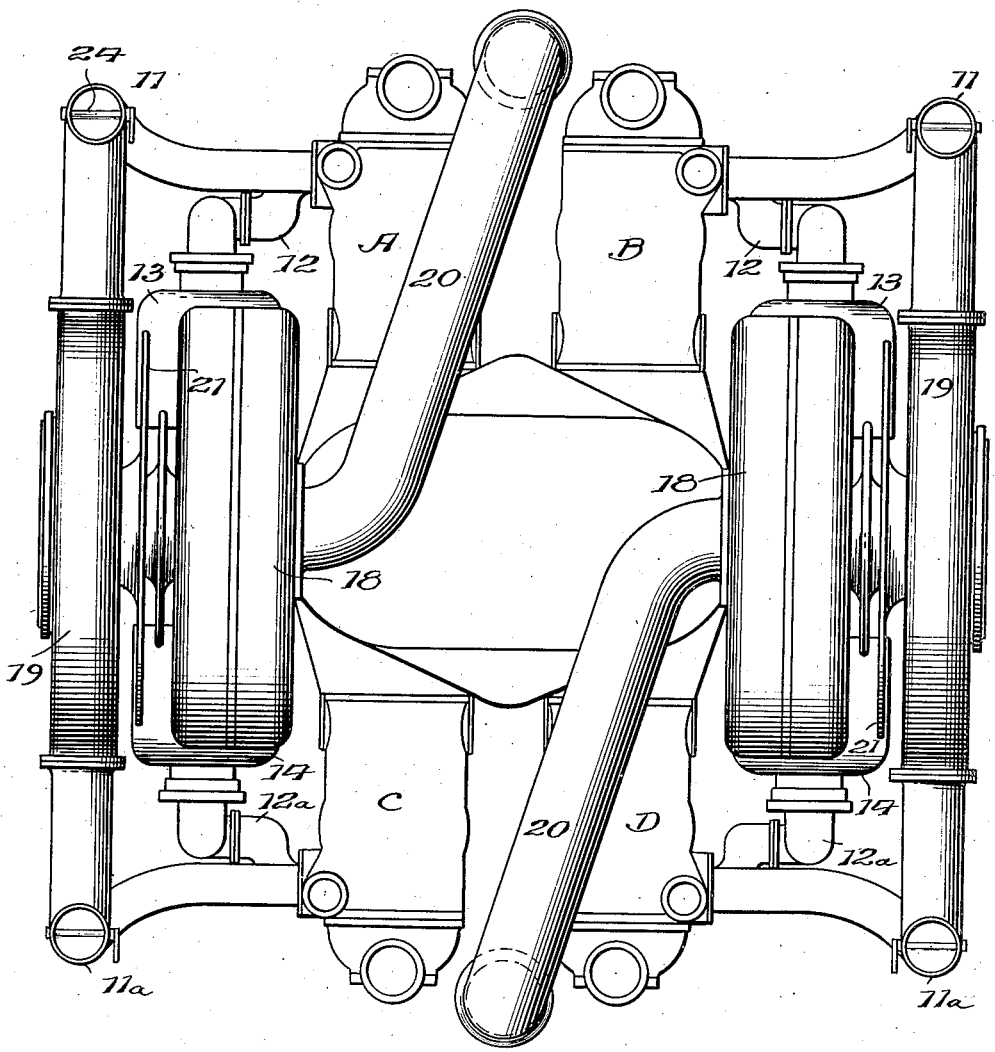

2,163,357

UNITED STATES PATENT OFFICE 2,163,357

MULTICYLINDER ENGINE ASSEMBLY

Louis R. Spencer, West Hartford, Conn., assignor to Spencer Aircraft Motors, Inc., Hartford, Conn., a corporation of Connecticut Application July 19, 1938, Serial No. 220,060

9 Claims. (Cl. 60—13)

This invention relates to improvements in internal combustion engine assemblies and, particularly, to motors especially adapted for use in aircraft or aeroplanes.

The primary object of the invention is to provide an internal combustion motor assembly having turbine-driven blowers for augmenting the supply of gas to the motor and, particularly, the supply of air to the motor as, for instance, when the motor is operating at elevations where the air is more or less rarefied.

Another object of the invention is to incorporate the turbines and the blowers driven thereby in the motor assembly without materially increasing the frontal or cross-sectional area of the front of the assembly.

A still further object is to assemble the blowers and their turbines with the engine block in such fashion as to produce a stream-lined effect in the sense that the assembly, as a whole, is more or less of tapering formation forwardly of the motor.

A still further object is to provide a motor assembly having upper and lower vertically arranged cylinders in the power unit, with separate carbureters for the upper and lower cylinders, whereby the differential between the up-draft and down-draft feed of fuel through the respective carbureters to their cylinders may be compensated for by individual adjustment of the independent carbureters. In this connection, the vertical spacing of the upper and lower cylinders affords ample space for accommodation of the carbureters and the connection between said carbureters and the turbine-driven blowers, whereby the over-all, transverse dimension of the assembly is not materially increased.

Another object is the provision of a motor assembly comprising turbine-driven blowers in which the turbine, and particularly the support bearings thereof, are efficiently cooled and the exhaust from the turbines is directed outwardly from the assembly into the slip stream of the motor.

With these and other objects in view, the invention consists in certain details of construction and combinations and arrangements of parts, all as will hereinafter be more fully described, and the novel features thereof particularly pointed out in the appended claims.

In the accompanying drawings—

Figure 1 is a top plan view of a motor assembly embodying the present improvements, the cowling being shown in dot and dash, and the engine block and cylinders illustrated more or less in outline;

Fig. 2 is a side elevational view of the structure illustrated in Fig. 1, a portion of the turbine casing being broken away; and Fig. 3 is a rear end elevational view of the assembly.

As previously noted, the present invention is especially applicable to motor units for aircraft and, in order to provide a motor unit of maximum efficiency, as regards both the power generated thereby and the resistance offered by the unit in the movement of the craft through the air, the several cylinders constituting the unit, are arranged in what is rather commonly known as an H-type engine. As indicated more or less diagrammatically in the drawings, the engine block of the present unit contains twenty-four (24) cylinders arranged in rows of six (6) disposed parallel or axially of the propeller shaft 10, with two parallel rows off six (6) cylinders each above the plane of the propeller shaft and two corresponding rows below said shaft. The two upper rows are constituted by the cylinders A and B, respectively, and the lower rows by the cylinders C and D, respectively. This vertical arrangement of the upper and lower rows provides an intermediate space between the intake and exhaust manifolds of the upper and lower sets of cylinders of such size as to substantially accommodate the fuel supply devices, as will hereinafter be described in detail. The exhaust manifolds of the upper cylinders are indicated at 11, and the exhaust manifolds for the lower cylinders at 11ª, while the intake manifolds of the upper cylinders are indicated at 12, and those for the lower cylinders at 12ª. In the space at each side of the cylinder block, there are separate carbureters for the upper and lower cylinders, the carbureter for the upper cylinders at one side of the block being indicated at 13, and the carbureter for the lower cylinders at 14. These carbureters communicate with a conduit 15 disposed lengthwise of the engine block and provided at its forward end with a valve 16 by means of which said end of the conduit can be closed or opened at the will of the operator. The rear end of conduit 15 communicates with a cooling unit 17 which, in turn, is connected to the casing of a blower 18 adapted to be driven by a turbine 19. It will be understood that there are similar arrangements of fuel feed devices at each side of the engine and, as is best indicated in Fig. 1, the two blowers 18 are located inwardly with respect to the turbines 19 and the air-supply conduits 20 for the blowers are directed inwardly toward the center of the engine block, the supply conduit of one blower being disposed upwardly to a point above the cylinders A, B, while the other is disposed downwardly to a point below the cylinders C, D. The blowers are positioned somewhat behind the engine block, but the turbines 19 are entirely substantially spaced laterally beyond the block, so that the nozzle which is on the inner side wall of each turbine is located in the slip stream of the motor. In this connection, each turbine is provided with the usual deflector member 21 which aids in directing the air from the slip stream into the interior of the turbine casing toward the turbine bearings, with the result that the temperature at these points is minimized as much as is practical. To further aid in cooling the turbine bearings, a ram or comparatively large conduit 22 is provided at each side of the block, through which air will be forced by the forward motion of the aircraft and which air will be caused to directly impinge upon the deflector members 21 which will, in turn, tend to direct it toward the bearings, as just described.

This arrangement of the turbines and the blowers driven thereby at the rear of the engine block, with the blowers substantially in the rear of the block but with the turbines located somewhat beyond the sides of the block, gives the assembly as a whole a forwardly tapering outline in a horizontal plane. Thus, the frontal or cross-sectional dimensions of the forward end of the assembly are not increased and the assembly as a whole has a stream-lined contour rearwardly of the craft, thus minimizing wind resistance on the part of the assembly in flight. At the same time, the location of the turbines, somewhat beyond the sides of the assembly, insures efficient cooling of the turbines by air from the slip stream. Another important feature is the fact that, with the discharge of each turbine disposed outwardly of the assembly, the turbines discharge into the slip stream, so that the exhaust gases of the motor, which are utilized for operating the turbines, are more or less instantly dissipated as they emerge from the turbines.

As illustrated, the upper and lower exhaust manifolds 11, 11ª, at each side of the assembly, are connected to the turbine at the corresponding side of the assembly, so that the pressures built up by the gases exhausted from the several cylinders are utilized for actuating the turbines. It will be understood that this force feed of air created by the turbines and blowers for augmenting the supply of air to the carbureters is utilized principally when the aircraft is operating at elevations where the atmosphere is more or less rarefied but that, at lower elevations, the supply of air to the carbureters may be adequate without the use of this force feed. It is for this reason that the forward end of the conduit 15 is provided with the valve 16, so that said conduit may be opened at its forward end for supplying air to the carbureters when the turbines and blowers are not in operation. In order that the turbines may be rendered inoperative, the exhaust manifolds are provided with by-passes 23 extending from the rear portion of said manifolds and provided with valves 24 for opening or closing the same. Thus, when it is desired to utilize the turbines and blowers to augment the supply of air to the carbureters, the valves 24 in by-passes 23 will be closed. Likewise, the speed of operation of the turbines may be varied by altering the positions of valves 24, or if it is desired to render the turbines inoperative, the valves 24 will be moved to fully opened positions, it being understood that, under these conditions, the valves 16 in the air-supply conduits 15 will be open.

In connection with the upper and lower rows of vertically disposed cylinders, it will be appreciated that due to the necessity of fuel flowing upwardly through the carbureters 13 to the upper rows of cylinders, while the fuel for the lower cylinders flows in a downward direction through carbureters 14, the differences in the resistance to the flow of fuel to the respective upper and lower rows of cylinders must be compensated for in order to equalize the supply of fuel to the several cylinders. It is for this reason that the provision and use of independent carbureters for the upper and lower cylinders at each side of the unit is quite advantageous, because the individual carbureters can be adjusted to insure a uniform flow or supply of fuel to all of the cylinders. It should be stated that this vertical arrangement of the cylinders and the vertical spacing of the same not only provides ample space between the manifolds of the upper and lower cylinders for the two carbureters and the connected conduits or elements, but, by having the carbureters and the connected parts located in this space, the over-all dimensions of the unit are not increased, at least to any material extent. There are, therefore, several factors which enter into the arrangement of the assembly as a whole in order to maintain a minimum frontal area combined with the stream-lined effect produced by the forwardly tapering appearance of the assembly. That is, it is the use of vertically spaced cylinders providing accommodation for the carbureters and other parts between the manifolds of the two sets of cylinders at each side of the assembly in combination with the location of the blowers and turbines at the rear of the engine block with the turbines projecting somewhat beyond the sides of the block that results in more or less gradually increasing the over-all, transverse dimension of the assembly in a rearward direction. It is these combined factors that give an assembly of minimum frontal area, with a rearwardly stream-lined effect so that, while the motor unit will have maximum power-generating abilities, its wind resistance will be held to a minimum.

What I claim is:

1. In an internal combustion motor assembly embodying turbines for augmenting the supply of fuel to said motor, a driven shaft, a row of cylinders extending axially of the shaft at each side thereof, a blower at the rear of each row of cylinders, a turbine for each blower, said turbines being positioned at the outer sides of said blowers with the nozzles of the turbines located at the inner sides thereof but in the slip stream of the motor and with the discharge of each turbine at the outer side thereof, carbureters for supplying fuel to said cylinders, and conduits connecting said blowers and carbureters.

2. In an internal combustion motor assembly embodying turbine-driven blowers for augmenting the supply of air to the motor, a driven shaft, vertically spaced cylinders arranged in rows axially of the shaft at opposite sides thereof, blowers mounted at the rear of the cylinders, a turbine for each blower positioned in the slip stream of the engine with the discharge of the turbines disposed outwardly to the side of said assembly, separate carbureters for the upper and lower cylinders, and conduits from said blowers to said carbureters.

3. In an internal combustion motor assembly embodying turbine-driven blowers for augmenting the supply of air to said motor, a driven shaft, an engine block comprising a plurality of cylinders arranged at opposite sides of said shaft with said rows of cylinders extending axially of the shaft, blowers at the rear of said block positioned in back of the block, a turbine for each blower positioned rearwardly of said block in the slip stream of the motor at each side of the block, said turbines having their discharge openings disposed outwardly away from the block, carbureters for said cylinders, and conduits from said blowers to said carbureters.

4. In an internal combustion motor assembly comprising turbine-driven blowers for augmenting the supply of fuel to the motor, a driven shaft, an engine block comprising a plurality of cylinders arranged in rows at opposite sides of said shaft with said rows of cylinders disposed axially of the shaft, blowers positioned in rear of said block, a turbine for each blower spaced laterally of its blower in the slip stream of the motor, carbureters for said cylinders, and conduits between said blowers and carbureters, the disposition of said blowers and turbines relatively to said engine block imparting a forwardly tapering appearance, in a horizontal plane, to the assembly as a whole.

5. In an internal combustion motor assembly comprising turbine-driven blowers for augmenting the fuel supply of fuel to the motor, a driven shaft, an engine block comprising upper and lower rows of cylinders at opposite sides of said shaft, a carbureter for each row of cylinders, a blower for each pair of rows of upper and lower cylinders, a turbine for driving each blower, and a conduit from each blower to the carbureters of one pair of rows of cylinders.

6. In an internal combustion motor assembly comprising turbine-driven blowers for augmenting the supply of fuel to the motor, a driven shaft, an engine block comprising upper and lower rows of cylinders at opposite sides of said shaft, a carbureter for each row of cylinders, a blower for each pair of rows of upper and lower cylinder, a turbine for driving each blower, a conduit from each blower to the carbureters of one pair of rows of cylinders, a cooling unit in each of said conduit, and means at each side of the engine block for directing a blast of air toward the support bearings of said turbines.

7. In an internal combustion motor assembly comprising turbine-driven blowers for augmenting the supply of fuel to the motor, a driven shaft, an engine block comprising upper and lower rows of cylinders at opposite sides of said shaft, a carbureter for each row of cylinders, a blower for each pair of rows of upper and lower cylinders, a turbine for driving each blower, a conduit from each blower to the carbureters of one pair of rows of cylinders, a cooling unit in each of said conduit, and means at each side of the engine block for directing a blast of air toward the support bearings of said turbines, said turbines being located in the slip stream of the motor with their discharges directly laterally outward from the block.

8. In an internal combustion motor assembly comprising turbine-driven blowers for augmenting the supply of fuel to said motor, a driven shaft, an engine block comprising upper and lower rows of cylinders at opposite sides of said block, corresponding upper and lower carburetors at each side of the block, a valved conduit open at its forward end for supplying air to said carbureters, blowers at the rear of said block, turbines at the rear of the block for driving said blowers, said turbines having their nozzles located in the slip stream of the motor, and a conduit connecting each pair of carbureters with one of said blowers.

9. In an internal combustion motor assembly comprising turbine driven blowers for augmenting the supply of fuel to the motor, an engine block having upper and lower rows of cylinders at each side thereof, corresponding upper and lower carbureters between the two rows of cylinders at each side of the block, a turbine at each side of the block in the rear thereof with its nozzle and discharge located in the slip stream of the motor, blowers adapted to be driven by said turbines, said blowers being located laterally inwardly with respect to the turbines, intake pipes for the blowers having their inlet ends extending substantially to the horizontal center of the black, and conduits connecting each pair of carbureters to the exhaust side of one of said blowers, the assembly as a whole having a tapering form forwardly of the motor.

LOUIS R. SPENCER.